Aug. 14, 1934.  E. B. CARTER ET AL  1,969,924
CABLE WINDING DEVICE
Filed April 9, 1932   3 Sheets-Sheet 2
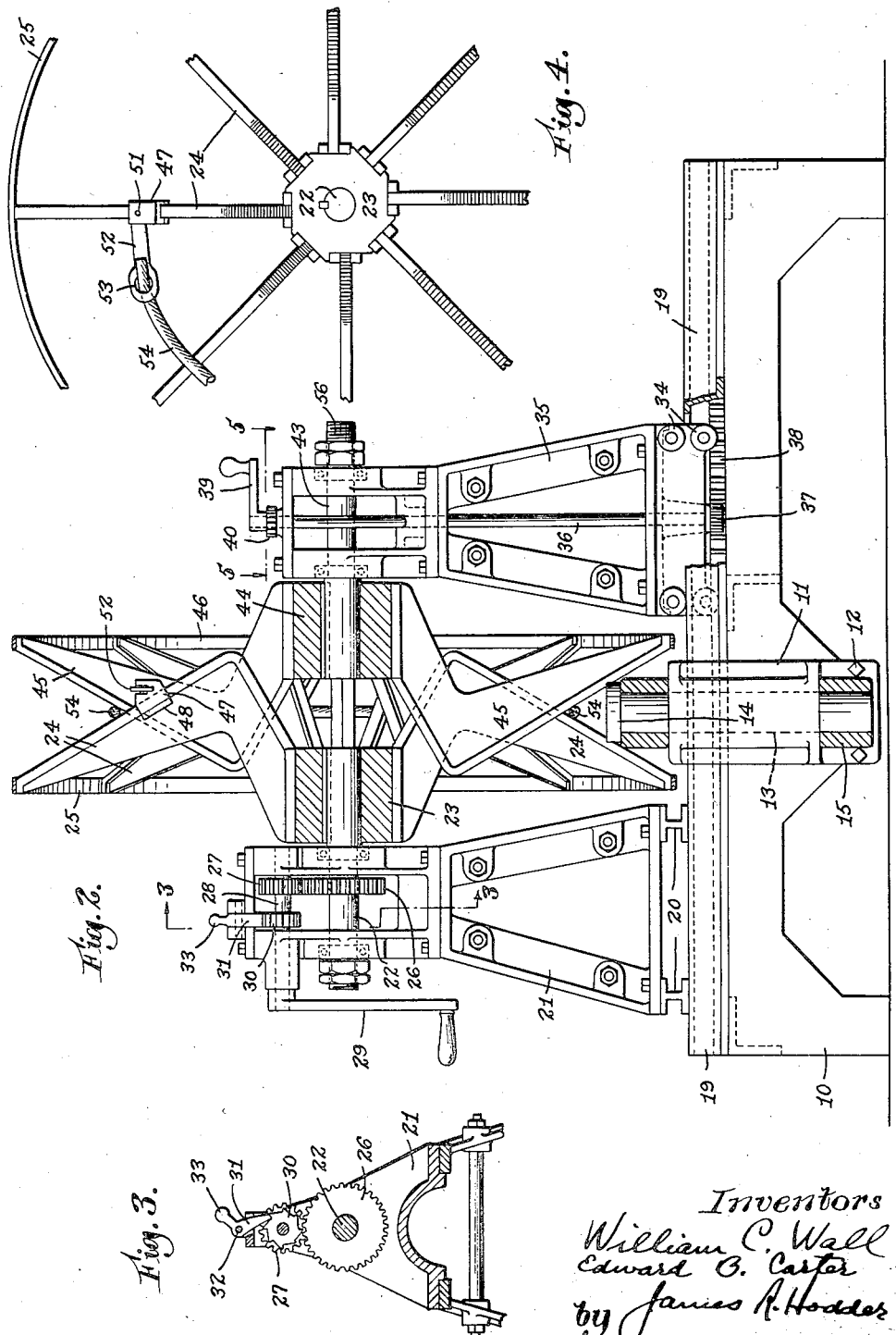
Inventors
William C. Wall
Edward B. Carter
by James R. Hodges
Attorney

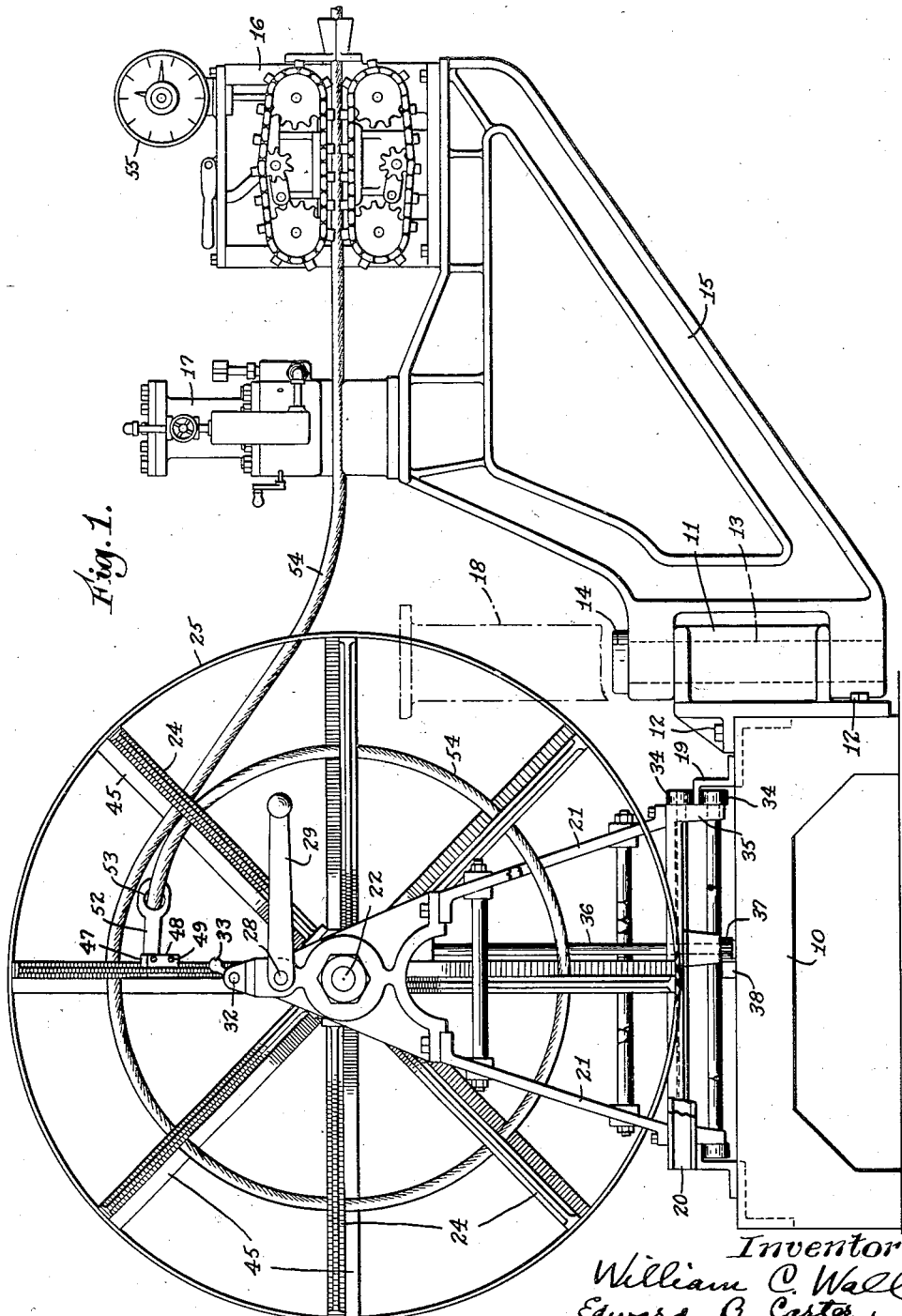

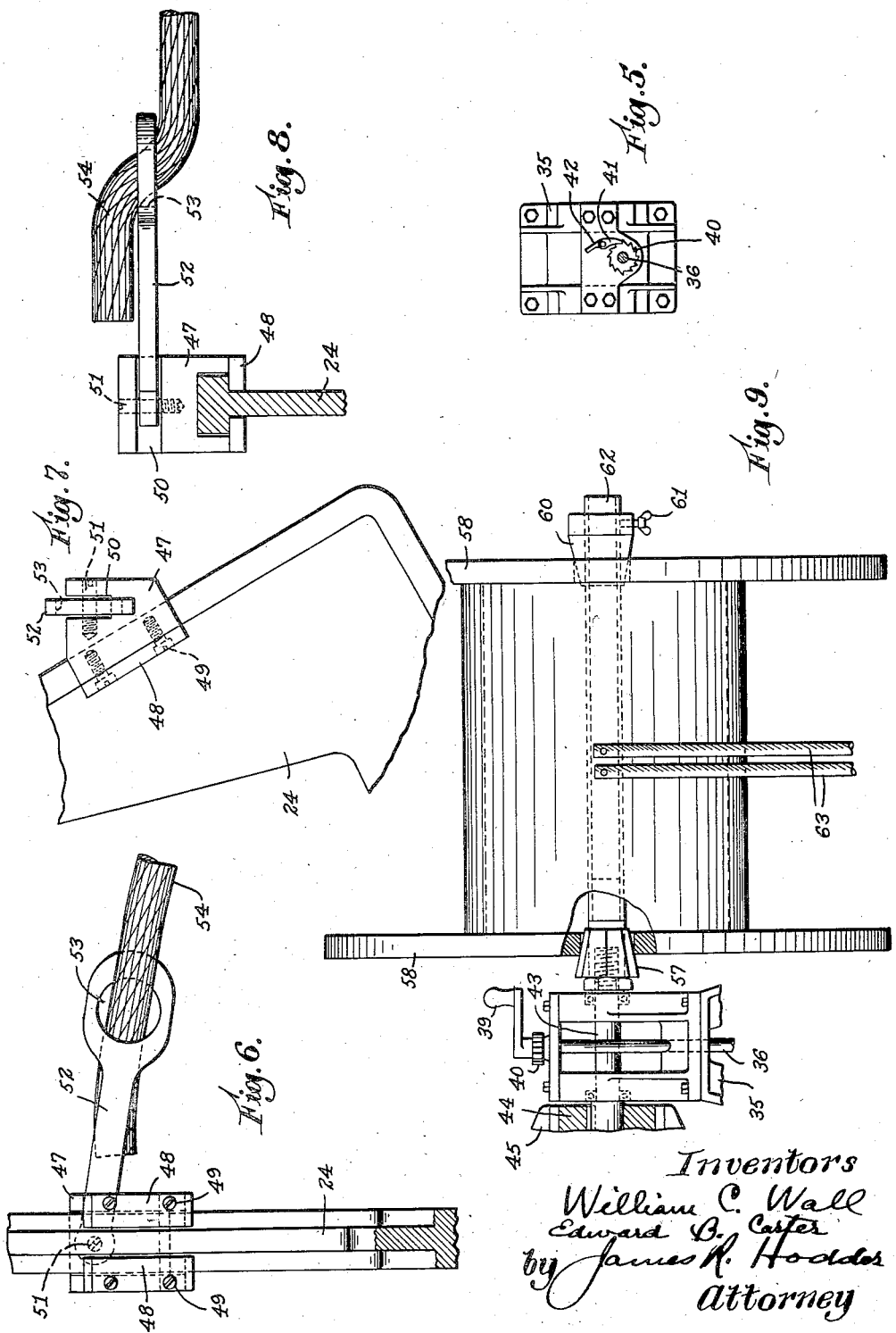

Patented Aug. 14, 1934

1,969,924

UNITED STATES PATENT OFFICE 1,969,924

CABLE WINDING DEVICE

Edward B. Carter, Lexington, and William C. Wall, Cambridge, Mass.

Application April 9, 1932, Serial No. 604,267

10 Claims. (Cl. 242—54)

Our present invention relates to cable winding machines, and includes, in combination, cable measuring and cable cutting means.

The apparatus of the present application is effective in the winding, or winding, measuring and cutting, of cables or other analogous material, whether wire cable, rope cable, rope, wire, and in fine, any flexible material of the above or analogous natures adapted to be wound or coiled in predetermined lengths. Therefore, although the apparatus of the present application is operable upon any of the foregoing types of materials, for brevity and clarity we have used throughout the specification and claims the generic term "cable", which it is to be understood includes all of the foregoing or analogous materials.

In preparing many of such materials for shipment and sale, it is essential that the same be measured with extreme accuracy, due to the cost involved, and it is also desirable that the mechanism utilized to measure, wind and cut such device be as compact as possible for facility of handling, as well as saving in space and labor. To this end we have devised the novel apparatus herein disclosed, described and claimed.

An important object of the present invention resides in the provision, in a unitary apparatus, of a measuring machine, and a machine to wind the measured material, coupled with a cutting device interposed between the measuring machine and the winding device in fixed relation thereto. By this combination we are enabled to effect the measuring, winding and cutting operations with a minimum of labor and with a minimum of required space for the machines utilized.

Another important object of the present invention resides in the provision of a novel winding reel and its associated mechanism.

The wound coils of cables, or the like, are frequently of considerable weight, and the handling thereof, including the removal thereof from the winding drum, presents many difficulties.

A further feature of the present invention, therefore, resides in the fact that, with our novel reel, the wound coil is automatically discharged from the winding reel, thus obviating the necessity of manual removal therefrom.

Our novel winding reel comprises a rotatable conical spider, and a cooperating idling conical spider with means to adjust or move said idling spider toward or from said rotating spider.

By this means we are enabled, at will, to vary the effective diameter of a coil of material to be wound on said reel, and by said means, also, we are enabled to separate the idling spider from the rotating spider a sufficient distance to permit the wound coil to automatically slide from said drum or reel to a position to be rolled away from the winding machine.

Another feature of our invention resides in the provision of a machine which is compact, simple of construction and operation, rugged, durable and economical, as well as efficient to a high degree.

In our novel combination of measuring, winding and cutting apparatus, we preferably utilize the particular cutting device illustrated, described and claimed in our copending application, Ser. No. 604,266, filed April 9, 1932, and also preferably utilize the particular measuring device illustrated, described and claimed in our copending application Ser. No. 604,268, filed April 9, 1932.

All of the above, together with other features and objects of the present invention, combinations of parts, details of construction and advantages, will be hereinafter more fully pointed out, described and claimed.

Referring to the drawings, illustrating a preferred embodiment of the present invention, Fig. 1 is a side elevation, partly broken away, of our novel combined measuring, winding, and cutting apparatus;

Fig. 2 is a side elevation, partly in section, of our novel winding reel;

Fig. 3 is a vertical sectional view on the line 3—3 of Fig. 2;

Fig. 4 is a fragmentary end elevation of the rotating conical spider;

Fig. 5 is a plan sectional view on the line 5—5 of Fig. 2;

Fig. 6 is an enlarged fragmentary detail illustrating the attachment of the cable end to the rotating spider;

Fig. 7 is a fragmentary detail illustrating the sliding shoe and cable latch;

Fig. 8 is a top plan view of Fig. 6; and

Fig. 9 is a side elevation illustrating a modification.

Referring now to the drawings, for a particular description of the invention, its construction and operation, 10 designates a base to which a bracket 11 is fixed by bolts 12. This bracket 11 has a vertical bore 13 therethrough in which is seated the headed pintle 14, and pivoted or hinged to the pintle 14 is an arm 15. Mounted on the arm 15 is a measuring device, illustrated generally at 16. This measuring machine is preferably of the type illustrated, described and claimed in our said copending application, and is therefore not illustrated or described in detail herein, reference being hereby made to said copending application for a complete disclosure of said measuring device. Also mounted on the arm 15 is a cutting device 17, this cutting device being preferably of the type illustrated, described and claimed in our said copending application, Ser. No. 604,266, and reference is hereby made to said copending application for a complete disclosure of said cutting device.

Because of the pivoted mounting of the arm 15, this arm may be swung to a compacted position, as illustrated in dotted lines at 18, for facility in moving, as, for example, on the floor of a warehouse. For this purpose also, the base 10 may be provided with rollers or casters, as will be readily understood.

Mounted on the base 10 are two tracks 19, and spanning said tracks is a pair of supporting channel beams 20, on which is mounted a standard or support 21. Rotatably mounted in the standard 21 and in suitable bearings provided therefor is a shaft 22, to one end of which is fixed a hub 23 of a conical spider comprising a plurality of arms 24.

These arms are preferably of T-shape, for strength and rigidity, and surrounding the outer periphery of said arms, and fixed thereto, is a band or ring 25, this band or ring serving the dual function of a safety guard, as well as a reenforcement for the arms 24.

On the shaft 22 is a gear 26, and meshing with said gear is a driving pinion 27 mounted on the shaft 28, which is carried in suitable bearings in the support or standard 21. To the outer end of the shaft 28 is fixed a handle 29 for manual rotation of the shaft 28, although it will be appreciated and understood that said shaft 28 may be power operated if desired. It will thus be apparent that rotation of the handle 29 in a clockwise direction will effect rotation of the gear 26, shaft 22, and hence of the spider 24, in a counter-clockwise direction. To prevent inadvertent or undesired reverse rotation of the spider 24, we provide on the shaft 28 a ratchet 30, engaging with which is a pawl 31, pivoted at 32 and provided with a handle portion 33 by means of which the pawl 31 may be disengaged from the ratchet 30 to permit reverse rotation of the spider 24 if desired.

Mounted on the tracks 19 by means of rollers 34 is a standard 35 substantially similar to the standard 21. A shaft 36 extends vertically through the standard 35 and has on its lower end a pinion 37 meshing with a rack 38 fixed to the base 10. To the upper end of the shaft 36 is affixed a handle 39 and on said shaft also is a ratchet 40, engaged by a pawl 41 to permit rotation of said shaft in but one direction, rotation in the other direction being permitted by tripping of the pawl 41 by means of its handle portion 42, as will be hereinafter more fully explained.

Rotatably mounted in suitable bearings in the standard 35 is a shaft 43, to one end of which is fixed the hub 44 of a conical spider comprising the arms 45 and the encircling band 46 similar to the band 25.

While we have referred to the rotatable spider as comprising the arms 24, we have also, for brevity, designated the spider generally as 24, and likewise with the arms and spider 45. The arms 24 and 45 are tangentially mounted on their hubs to insure contact of the cooperating arms throughout substantially their length for best efficiency in operation.

The spider 45 is an idling spider, and rotation is imparted thereto by contact of the arms 24 therewith, as clearly illustrated in Fig. 1.

By means of the handle 35, shaft 36, pinion 37 and rack 38, we are enabled to effect movement of the idling spider 45 toward or from the spider 24 at will. Thus it will be appreciated that by this relative movement we may vary the effective diameter of the reel comprising the spiders 24 and 45 to any desired size within the limits of said spiders. When the spider 45 has been moved into proper cooperative relationship with the spider 24, for desired size of coil, the pawl 41 and ratchet 40 will prevent separation of said spiders until such separation is desired, as will be hereinafter more fully explained.

Slidably mounted on the flange of one of the arms 24 is a shoe 47 to which the plates 48 are affixed by screws 49, said plates projecting under the flange of said arm 24 to lock said shoe to said flange. The shoe 47 is provided with a slot 50 through which passes a screw 51 having a smooth portion constituting a pivot for the latch 52, said latch being provided at its outer end with an aperture 53 to receive the free end of a cable 54, by means of which said cable may be locked or clamped in position to insure winding.

The operation of our novel machine is simple and will be readily understood by those skilled in this art, being briefly described as follows:

It being desired to wind a desired cable 54 into a coil of predetermined length for convenient handling, shipping, or the like, said cable is first conducted through the measuring device 16, and through the cutting device 17. At this point the hands of the indicator 55 may be set at zero. Thereupon the cable 54 is pulled through the cutting device 17 and the measuring device 16, inserted in the aperture 53 of the latch 52, as illustrated in Figs. 6 and 8, and the handle 29 then rotated. This will effect a rotation of the winding reel in a counter-clockwise direction, as clearly illustrated in Fig. 1, and as the cable 54 is drawn through the measuring device 16, the length of cable will be accurately indicated at 55. When the indicator 55 designates the desired length, the cutting device 17 is operated, severing the cable 54 and leaving on the reel the coil of desired length. Thereupon this coil may be bound or tied in any desired manner, and the pawl 41 is released from the ratchet 40. Thereupon rotation of the handle 39 in a counter-clockwise direction will effect a travel of the pinion 37 along the rack 38, and a movement of the idling spider 24. This movement is continued until the said spiders are entirely separated, with a sufficient space therebetween to permit the coil to drop from between the spiders by its own weight, whence it may be rolled to any desired point.

The simplicity, efficiency, and accuracy of our device will be instantly apparent to and understood by those skilled in the art, and since we believe that said combined measuring, winding and cutting device is novel, we have claimed the same broadly in the present application.

We believe that the winding reel illustrated and above described is also novel, and have likewise claimed said reel herein.

In the event that it should be desired to wind two coils of cable simultaneously, this may be effected in the following manner:

To the threaded end 56 of the shaft 43 may be affixed a shaft 62, a driving member 57 engaging one end 58 of a standard spool 59, said spool being held in position by the conical plug 60 and set screw 61 bearing against the shaft or sleeve 62. To the spool 59 a pair of cables 63 are affixed, in any desired manner. Thereupon rotation of the shaft 43 in the manner above described will effect rotation of the spool 59, and a consequent winding of the cables 63 on said spool.

It frequently happens that two cables of the same strength and possessing the same properties of stretch, and the like, are desired, for example, in elevator installations, and therefore the simultaneous winding of these cables on the single spool, such as 59, insures the keeping of cables of uniform properties in a convenient manner. It will be understood and appreciated that the spool 59, when the cables 63 have been wound thereon, is removed and constitutes the shipping spool for said cables.

While we have necessarily described our present invention somewhat in detail, it will be appreciated that we may vary the size, shape, and arrangement of parts within reasonably wide limits without departing from the spirit of the invention.

Our invention is further described and defined in the form of claims as follows:

1. A cable winding reel, comprising a conical spider, means to rotate the same, a second conical spider, and means to effect relative movement between two said spiders to vary the effective diameter of said reel and to effect complete separation of said spiders.

2. A cable winding reel, comprising a pair of opposed interengaging conical spiders, and means to effect relative movement between said spiders to vary the effective diameter of said reel and to effect complete separation of said spiders.

3. Apparatus of the kind described, comprising a base, a standard fixed thereon, a shaft journaled in said standard, means to rotate said shaft, a conical spider rotatable with said shaft, a standard slidably mounted on said base, a shaft journaled in said slidable standard, a conical spider carried by said second shaft, and means to effect engagement and disengagement of said two spiders.

4. Apparatus of the kind described, comprising a base, a standard fixed thereon, a shaft journaled in said standard, means to rotate said shaft, a conical spider rotatable with said shaft, a standard slidably mounted on said base, a shaft journaled in said slidable standard, a conical spider carried by said second shaft, and means to effect engagement of said spiders to receive and coil a length of cable and to effect disengagement of said spiders to automatically discharge said coil therefrom.

5. Apparatus of the kind described, comprising a base, a standard fixed thereon, a shaft journaled in said standard, means to rotate said shaft, a conical spider mounted on said shaft for rotation therewith, a standard slidably mounted on said base, a shaft journaled in said slidable standard, a conical spider carried by said second shaft and cooperating with said first spider to constitute a winding reel, a rack on said base, a vertical shaft carried by said second standard, a pinion on said vertical shaft in mesh with said rack, and means to effect rotation of said shaft, whereby movement of said second standard and its spider along said base is effected.

6. Apparatus of the kind described, comprising a base, a standard fixed thereon, a shaft journaled in said standard, means to rotate said shaft, a conical spider rotatable with said shaft, a standard slidably mounted on said base, a shaft journaled in said slidable standard, a conical spider carried by said second shaft, means to effect engagement of said spiders to receive and coil a length of cable and to effect disengagement of said spiders to automatically discharge said coil therefrom, and means carried by said second standard for attachment of a shaft adapted to receive a cable spool.

7. Apparatus of the kind described, comprising a base, a standard fixed thereon, a shaft journaled in said standard, means to rotate said shaft, a conical spider rotatable with said shaft, a standard slidably mounted on said base, a shaft journaled in said slidable standard, a conical spider carried by said second shaft, and means to effect engagement of said spiders to receive and coil a length of cable and to effect disengagement of said spiders to automatically discharge said coil therefrom, the spider carrying shaft in said slidable standard extending beyond the end of said standard and being provided with means for attachment of an additional winding spool thereto.

8. A cable winding reel, comprising a conical spider, means to rotate the same, a second conical spider, means to effect relative movement between the said spiders to vary the effective diameter of said reel, a sliding shoe carried by one of said spiders, and cable-retaining means carried by said shoe.

9. A cable winding reel, comprising a conical spider, means to rotate the same, a second conical spider, means to effect relative movement between two said spiders to vary the effective diameter of said reel, and cable-retaining means carried by one of said spiders.

10. Apparatus of the kind described, comprising a base, a standard thereon, a shaft journaled in said standard, means to rotate said shaft, a conical spider rotatable with said shaft, a second standard on said base, a shaft journaled in said second standard, a conical spider carried by said second shaft, and means to effect engagement and disengagement of said two spiders.

EDWARD B. CARTER.
WILLIAM C. WALL.